United States Patent
Zheng et al.

(10) Patent No.: US 10,364,670 B1
(45) Date of Patent: Jul. 30, 2019

(54) AZIMUTHALLY ACOUSTIC IMAGING LOGGING WHILE DRILLING (LWD) APPARATUS

(71) Applicant: Institute of Geology and Geophysics, Chinese Academy of Sciences, Beijing (CN)

(72) Inventors: Jian Zheng, Beijing (CN); Wenxuan Chen, Beijing (CN); Qingyun Di, Beijing (CN); Zili Wang, Beijing (CN); Yuntao Sun, Beijing (CN); Yongyou Yang, Beijing (CN); Wenxiu Zhang, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/123,650

(22) Filed: Sep. 6, 2018

(30) Foreign Application Priority Data

May 9, 2018 (CN) .......................... 2018 1 0438748

(51) Int. Cl.
*G01V 1/52* (2006.01)
*E21B 47/14* (2006.01)

(52) U.S. Cl.
CPC ............... *E21B 47/14* (2013.01); *G01V 1/52* (2013.01); *G01V 2001/526* (2013.01)

(58) Field of Classification Search
CPC ..... E21B 47/14; G01V 1/52; G01V 2001/526
See application file for complete search history.

(56) References Cited

U.S. PATENT DOCUMENTS

| 7,364,007 | B2 * | 4/2008 | Garcia-Osuna | E21B 47/01 181/108 |
| 7,367,392 | B2 * | 5/2008 | Duong | E21B 47/01 166/249 |
| 2005/0067191 | A1 * | 3/2005 | Miyamoto | G01V 1/52 175/50 |
| 2005/0083064 | A1 * | 4/2005 | Homan | G01V 3/28 324/347 |

(Continued)

*Primary Examiner* — Hovhannes Baghdasaryan
(74) *Attorney, Agent, or Firm* — Novick, Kim & Lee, PLLC; Allen Xue (57) ABSTRACT

An azimuthally acoustic imaging logging while drilling (LWD) apparatus employs two sets of transmitting transducers to excite multipole mode waves. One set is high-frequency monopole and polarized pole transmitting transducers, and the other set is low-frequency dipole and quadrupole transmitting transducers. Separation of a high-frequency transmitting state from a low-frequency transmitting state is realized by using a dual-row transmission solution. Each set of transmitting transducers operates at transducer resonance points through a matching circuit, thereby greatly increasing the transmitted energy. An operation mode of the azimuthally acoustic imaging LWD apparatus includes four kinds of transmitting modes of monopole, dipole, quadrupole and polarized pole; in terms of a sound insulator, a combined sound insulation mode of inner notch groove and inner reducers and tungsten rods is adopted; and signal reception may be realized by employing a high-sensitivity receiving transducer, which can effectively realize the signal reception.

10 Claims, 4 Drawing Sheets

(56) References Cited

U.S. PATENT DOCUMENTS

| | | | | |
|---|---|---|---|---|
| 2005/0152219 | A1* | 7/2005 | Garcia-Osuna | G01V 1/52 367/25 |
| 2006/0062082 | A1* | 3/2006 | Mandal | G01V 1/44 367/25 |
| 2006/0256655 | A1* | 11/2006 | Sinha | G01V 1/50 367/31 |
| 2007/0183259 | A1* | 8/2007 | Yogeswaren | G01V 1/44 367/25 |
| 2009/0067286 | A1* | 3/2009 | Bose | G01V 1/48 367/38 |
| 2011/0280102 | A1* | 11/2011 | Wang | G01V 1/50 367/31 |
| 2011/0280104 | A1* | 11/2011 | McClung, III | E21B 3/02 367/82 |
| 2013/0257629 | A1* | 10/2013 | Hallundbæk | E21B 47/122 340/854.6 |
| 2017/0285206 | A1* | 10/2017 | Sakiyama | G01V 1/50 |

* cited by examiner

AZIMUTHALLY ACOUSTIC IMAGING LOGGING WHILE DRILLING (LWD) APPARATUS

TECHNICAL FIELD

The present invention mainly belongs to the technical field of acoustic velocity measurement, and particularly relates to an azimuthally acoustic imaging logging while drilling (LWD) apparatus.

BACKGROUND

With the increasing drilling scale of oil and gas fields and the development of science and technology, especially the rapid development of a LWD technology, it is urgent to make the present advanced science and technology play an important role in the development of the oil and gas fields. An azimuthally acoustic LWD technology is one of the LWD technology. Acoustic LWD enables acoustic logging while drilling, which can effectively detect lithological characters, physical properties and reservoir parameters of a wellbore wall formation with respect to wireline logging, wherein data obtained by the LWD is slightly influenced by invasion of a drilling fluid.

A compressional wave velocity and a shear wave velocity of a formation are obtained by an acoustic LWD instrument, and can be used to establish a pore pressure gradient and a permeability, evaluate a wellbore stability, interpret lithological changes, and detect a flow effect of a fluid in a wellbore, thereby providing important geosteering information for a drilling operation. However, since acoustic LWD is affected by a drilling noise, circulation of a drilling fluid and drill collar waves, and due to the particularity of a drilling working environment, the realization of the acoustic LWD is much more complicated than that of a wireline logging technology.

How to effectively achieve function matching of a transmitting acoustic system and improve transmitted energy, how to improve the receiving sensitivity of receiving transducers and improve a signal-to-noise ratio of signal reception and developing a sound insulation technology for drill collar direct waves, which is effective for monopole, dipole, quadrupole and polarized pole, become the focus of research and development of the acoustic LWD instrument.

In the prior art, the acoustic LWD instrument typically employs a monopole operation mode, a dipole operation mode, and a monopole, dipole and quadrupole operation mode.

However, in the prior art, shear wave information cannot be obtained at a soft bottom layer by adopting monopole logging, and Stoneley wave information of a formation cannot be obtained. In the prior art, when the dipole operation model is adopted, a manner of inner notch grooves and outer notch grooves cannot effectively realize the propagation of bending waves in the drill collar waves, thereby causing overlapping of dipole acoustic waves with the drill collar waves. A signal to noise ratio of the received signal is extremely low, resulting in inaccurate measurements. Moreover, an acoustic dipole instrument is widely applied in the wireline logging. In terms of logging while drilling, the dipole acoustic waves are the bending waves, which easily overlap with the drill collar waves, causing interference to the dipole acoustic waves, so that information about the formation cannot be accurately measured. For the dipole acoustic waves, how to achieve effective sound insulation for the drill collar waves is a key to a design of the instrument. CN 104806234 A relates to an acoustic quadrupole LWD instrument, which employs ceramic tile stacked transmitting transducers and receiving transducers, and the transmitting transducers and the receiving transducers are both cylindrical and are uniformly distributed on a drill collar at intervals of 90 degrees. In terms of a sound insulator, sound insulation on the drill collar is performed by adopting the manner of the inner notch grooves and the outer notch grooves, and the LWD apparatus has monopole, dipole and quadrupole operation modes. However, since monopole acoustic waves are high-frequency signals and quadrupole acoustic waves are low-frequency signals, acoustic signals are excited by employing the same set of transducers. Due to a natural frequency property of the transducers, there is a signal with weak energy inherently. It is difficult for the receiving transducers to receive useful acoustic signals.

SUMMARY

In view of the above technical problems, an objective of the present invention is to provide an azimuthally acoustic LWD apparatus that employs two sets of transmitting transducers to excite multipole mode waves, one set is high-frequency monopole and polarized pole transmitting transducers, the other set is low-frequency dipole and quadrupole transmitting transducers, separation of a high-frequency transmitting state from a low-frequency transmitting state is realized by using a dual-row transmission solution, and each set of transmitting transducers operates at transducer resonance points, thereby greatly increasing transmitted energy. Meanwhile, the transmitting transducers are of a tile structure, so as to be relatively large in radiation area.

Another objective of the present invention is to provide an azimuthally acoustic imaging LWD apparatus, wherein a sound insulator of the azimuthally acoustic imaging LWD apparatus adopts a combined sound insulation mode of inner notch grooves and inner reducers and tungsten rods, and effectively realizes sound insulation of monopole, quadrupole, polarized pole and dipole drill collar waves.

Yet another objective of the present invention is to provide an azimuthally acoustic imaging LWD apparatus, which has high-sensitivity receiving transducers to realize signal reception.

The present invention is achieved by the following technical solution.

An azimuthally acoustic imaging LWD apparatus includes a drill collar, transmitting transducers and receiving transducers disposed on the drill collar, and a sound insulator disposed between the transmitting transducers and the receiving transducers, wherein the transmitting transducers include two sets of transmitting transducers, that is, low-frequency transmitting transducers and high-frequency transmitting transducers, the low-frequency transmitting transducers and the high-frequency transmitting transducers both operate at transducer resonance points so as to increase transmitted energy.

The low-frequency transmitting transducers and the high-frequency transmitting transducers are used to excite multipole mode waves, the low-frequency transmitting transducers employ dipole and quadrupole operation modes, the high-frequency transmitting transducers employ monopole and polarized pole operation modes, and separation of a high-frequency transmitting state from a low-frequency transmitting state is realized by using dual-row transmission.

Further, the low-frequency transmitting transducers have resonance points of 2 kHz to 5 kHz, and the high-frequency transmitting transducers have resonance points of 10 kHz to 15 kHz; and the high-frequency transducers and the low-frequency transducers both operate at the transducer resonance points by a matching circuit, so that the maximum transmitted energy is obtained, and a signal-to-noise ratio of acoustic signals received by the receiving transducers is effectively increased. Monopole and polarized pole acoustic signals are transmitted by adopting high-frequency signals of 10 kHz to 15 kHz, and dipole and quadrupole acoustic signals are transmitted by adopting low-frequency signals of 2 kHz to 5 kHz, which have the following technical advantages: different operation modes are expected to obtain the maximum transmitted energy, so that the signal-to-noise ratio of the signals received by the receiving transducers is increased; and resonant frequencies of the transmitting transducers after compression molding are constant, that is, each transducer will resonate with an excitation signal only at one frequency point, the maximum transmitted energy of the transmitting transducers can be obtained at the resonance point, and the transmitted energy is relatively weak at other frequency points because the transducers cannot be resonated. According this characteristic of the transducers, the present invention employs two transducers with different resonance point frequencies, that is, transducers with resonance frequencies of 10 kHz to 15 kHz and 2 kHz to 5 kHz respectively are used to excite different signals, so that the maximum transmitted energy of the transmitting transducers is obtained, and the signal-to-noise ratio of acoustic signals in different operation modes is increased.

Both the low-frequency transmitting transducers and the high-frequency transmitting transducers are of a tile structure to increase the radiation area.

Further, at one signal transmitting end of the apparatus, the apparatus further includes transmitting circuit integrated units, transmitting end electrical connectors connected with the transmitting circuit integrated units, first electrical connection lines and second electrical connection lines; and the transmitting end electrical connectors are used to realize electrical connection.

The transmitting circuit integrated units are installed inside the drill collar, and include power supply batteries, transmitting integrated circuits, and boosting modules. The transmitting integrated circuits generate excitation signals of the transducers and amplify voltages through the boosting modules. The low-frequency transmitting transducers are connected with the transmitting circuit integrated units through the first electrical connection lines and the transmitting end electrical connectors.

The high-frequency transmitting transducers are connected with the transmitting circuit integrated units through the second electrical connection lines and the transmitting end electrical connectors. The low-frequency transmitting transducers and the high-frequency transmitting transducers are respectively fixed to an outer wall of the drill collar through low-frequency transmitting transducer glands and high-frequency transmitting transducer glands.

Further, at one signal receiving end of the apparatus, the apparatus further includes receiving circuit integrated units, and receiving end electrical connectors connected with the receiving circuit integrated units, wherein the receiving end electrical connectors are used to realize electrical connection;

The receiving transducers are connected with the receiving circuit integrated units through third electrical connection lines and the receiving end electrical connectors; and the receiving transducers are fixed to the outer wall of the drill collar by receiving transducer glands.

Further, the receiving transducers are manufactured by directly encapsulating a plurality of ceramic tiles onto an elongated support, and a signal preamplifier circuit module is disposed on the elongated support to implement timely amplification of received signals; and the entire elongated support has realized the equilibrium of pressures inside and outside the elongated support by hydraulic balancing apparatus potting or rubber potting. The elongated support is encapsulated in a rectangular corrugated pipe. The rectangular corrugated pipe is encapsulated with damping rubber on three sides and has a deformed surface on the other side. After being mounted on the drill collar, the elongated support is in contact with mud and deforms with an external pressure to achieve the equilibrium of pressures inside and outside the elongated support, so that the reception of acoustic signals can be effectively realized.

Among them, the entire elongated support can realize that the ceramic tiles are vibrated in a free state by the hydraulic balancing apparatus potting or rubber potting, so that the vibration intensity of the ceramic tiles is larger than that of ceramic tiles wrapped by an epoxy resin material, that is, the received signals are high in strength.

Moreover, the preamplifier circuit module is disposed on the elongated support, and the received signals can be amplified at a short distance and then transmitted to the receiving circuit integrated units, so that the signal to noise ratio of useful signals can be increased; if these signals are not pre-amplified, they will be interfered in a transmission process, resulting in a reduced signal to noise ratio. Further, the apparatus further includes a trace rod penetrating through the sound insulator, wherein an outer surface of the trace rod is notch-grooved, and one end of the trace rod is connected with the transmitting circuit integrated units, and its other end is connected with the receiving circuit integrated units.

Further, the sound insulator is used to realize sound insulation of monopole, quadrupole, polarized pole and dipole drill collar waves.

The sound insulator employs a combined sound insulation mode of inner notch grooves and inner reducers and hard alloy rod bodies; by additionally disposing the hard alloy rod bodies on the sound insulator, the balance weight of the sound insulator is increased, so that effective sound insulation of drill collar bending mode waves is realized; and effective sound insulation of drill collar direct waves is realized by additionally disposing a hard alloy balance weight and using a diffusion scattering principle.

A structure of the sound insulator is specifically as follows: the sound insulator includes a drill collar with notch grooves on an inner wall, and hard alloy rod bodies embedded in the outer wall of the drill collar, wherein the notch grooves on the inner wall of the drill collar include inner reducer structure grooves and inner notch grooves with constant diameters and widths, wherein the inner reducer structure grooves are disposed at one end, which is close to the receiving transducers, of the sound insulator, the number of the inner reducer structure grooves is 2 to 4, and the diameters of the inner reducer structure grooves are sequentially increased by an arithmetic progression along a direction from the transmitting transducers to the receiving transducers. Preferably, the diameter of the inner reducer structure groove with the largest diameter is the same as the diameter of the inner notch grooves, and the width of each inner reducer structure groove is three times the width of the inner notch grooves; and 9 to 10 inner notch groove structures are sequentially disposed inside the drill collar corresponding to the sound insulator from a transmitting end to a receiving end.

The structure of the sound insulator with inner notch grooves can effectively suppress compressional waves (noise signals) propagated in the drill collar, and the drill collar direct waves have a great influence on the acquisition of monopole signals; and the structure of the sound insulator with the inner reducer structure grooves can also effectively suppress the compressional waves (noises) propagated in the drill collar in a way of widening a sound insulation stop band of the drill collar. A sound insulation principle of the structure of the sound insulator with the inner reducer structure grooves is as follows: the grooves of each diameter can only effectively suppress signals of one frequency, and the frequency of suppressing the drill collar direct wave signals is widened by combining grooves of different diameters; and the outer wall of the drill collar is embedded with hard alloys, especially tungsten rods, which can effectively suppress shear wave signals (noise signals) propagated in the drill collar in a way of increasing a balance weight, and the signals have a greater influence on the acquisition of dipole and polarized pole signals. By means of the combined sound insulation mode of the inner notch grooves and the inner reducers and the hard alloy rod bodies, the drill collar direct waves such as the compressional waves and the shear waves propagated in the drill collar can be effectively suppressed.

Further, the hard alloy rod bodies embedded on the outer wall of the drill collar with the inner notch grooves include large outer-diameter cylindrical hard alloy rod bodies and small outer-diameter cylindrical hard alloy rod bodies; the large outer-diameter cylindrical hard alloy rod bodies are embedded at non-notch groove positions, and every four large outer-diameter cylindrical hard alloy rod bodies are uniformly distributed in a radial direction of the outer wall of the drill collar as one group; the small outer-diameter cylindrical hard alloy rod bodies are embedded at notch groove positions, and every four small outer-diameter cylindrical hard alloy rod bodies are uniformly distributed in a radial direction of the outer wall of the drill collar as one group; and through regular distribution of the hard alloy rod bodies, compressional waves propagated along the drill collar may be reflected back after encountering the tungsten rods. The inner notch grooves and the reducers realize sound insulation based on a principle that the compressional waves propagated along the drill collar may be reflected back when encountering the section of the drill collar. The sound insulator provided by the present invention can achieve a good sound insulation effect through the combined sound insulation mode of the inner notch grooves and the inner reducers and the tungsten rods. The hard alloy rod bodies preferably employ the tungsten rods because tungsten is a relatively high-density material, is high in hardness and simple in process, and only needs to be embedded in the drill collar. Other hard alloys YG3, YG6, and YG8 are also suitable for serving as embedding materials, but the density of ordinary hard alloys is not as large as that of the tungsten, and as the balance weight, the tungsten is a relatively suitable material. The larger the balance weight is, the severer the suppression of the shear waves (bending waves) when being propagated in the drill collar is, and the better the effect of suppressing the drill collar waves is.

Further, the large outer-diameter tungsten rods have outer diameters of 25 mm to 40 mm and lengths of 25 mm to 30 mm; and the small outer-diameter cylindrical tungsten rods have outer diameters of 10 mm to 15 mm and lengths of 5 mm to 8 mm.

The present invention has advantageous technical effects as follows.

The azimuthally acoustic imaging LWD apparatus provided by the present invention can measure parameters such as compressional wave, shear wave and Stoneley wave acoustic velocities and attenuations of the formation, and realize measurement of azimuthal information of the formation. Further, parameters such as lithological characters and porosity of the formation are obtained, and wellbore overpressure warning is carried out.

The azimuthally acoustic imaging LWD apparatus provided by the present invention employs two sets of transmitting transducers to excite multipole mode waves, one set is high-frequency monopole and polarized pole transmitting transducers, the other set is low-frequency dipole and quadrupole transmitting transducers, separation of a high-frequency transmitting state from a low-frequency transmitting state is realized by using a dual-row transmission solution, and each set of transmitting transducers operates at transducer resonance points, thereby obtaining the maximum transmitted energy and further effectively increasing the signal-to-noise ratio of the acoustic signals received by the receiving transducers. Meanwhile, the transmitting transducers are of a tile structure, thereby being larger in radiation area.

In terms of the receiving transducers, signal reception is realized by adopting one kind of high-sensitivity receiving transducers, such receiving transducers directly encapsulate 6 or 8 ceramic tiles onto a circuit board, and the circuit board is provided with a signal preamplifier circuit, so that timely amplification of the received signals is realized; and the entire circuit board is encapsulated in an elongated hydraulic balance structure, which can effectively realize the signal reception.

1. Drill collar; 2. Transmitting circuit integrated unit; 3-1. Transmitting end electrical connector; 3-2. Receiving end electrical connector; 4-1. First electrical connection line; 4-2. Second electrical connection line; 4-3. Third electrical connection line; 5. Low-frequency transmitting transducer; 6. Low-frequency transmitting transducer gland; 7. High-frequency transmitting transducer; 8. High-frequency transmitting transducer gland; 9. Sound insulator; 9-1. Inner notch groove; 9-2. Inner reducer structure groove; 10. Tungsten rod; 11. Trace rod; 12. Receiving transducer; 13. Receiving circuit integrated unit; and 14. Receiving transducer gland.

DETAILED DESCRIPTION

In order to make objectives, technical solutions and advantages of the present invention clearer, the present invention will be further described in detail below with reference to accompanying drawings and embodiments. It should be understood that specific embodiments described herein are merely illustrative of the present invention and are not intended to limit the present invention.

Rather, the present invention encompasses any alternatives, modifications, equivalents and solutions defined by claims and made within the spirit and the scope of the present invention. Further, in order to provide the public with a better understanding of the present invention, some specific details will be described in detail in the following detailed description of the present invention. The present invention may be fully understood by those skilled in the art without a description of these details.

Embodiment 1

Figure 1:
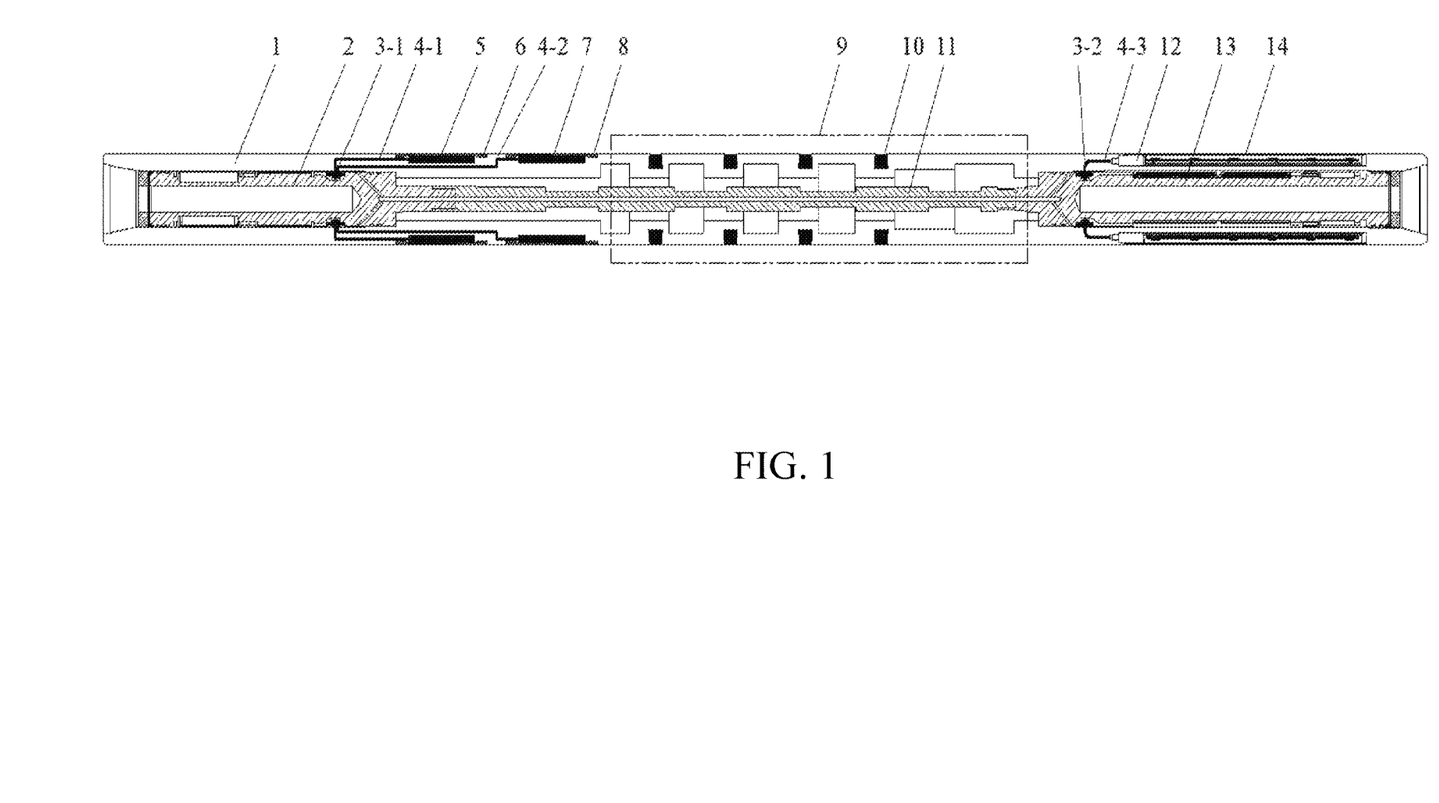
FIG. 1 is a schematic diagram showing a structure of an azimuthally acoustic imaging LWD apparatus according to an embodiment of the present invention.

This embodiment provides an azimuthally acoustic imaging LWD apparatus. As shown in FIG. 1, the apparatus includes a drill collar 1, transmitting transducers and receiving transducers 12 disposed on the drill collar 1, and a sound insulator 9 disposed between the transmitting transducers and the receiving transducers 12.

The transmitting transducers include two sets of transmitting transducers, that is, low-frequency transmitting transducers 5 and high-frequency transmitting transducers 7, to excite multipole mode waves, so as to increase transmitted energy.

The low-frequency transmitting transducers 5 employ dipole and quadrupole operation modes, the high-frequency transmitting transducers 7 employ monopole and polarized pole operation modes, and separation of a high-frequency transmitting state from a low-frequency transmitting state is realized by using dual-row transmission. Preferably, the low-frequency transmitting transducers 5 and the high-frequency transmitting transducers 7 are all formed by four arc-shaped ceramic tiles of 90 degrees respectively by epoxy resin and rubber potting.

Figure 2:
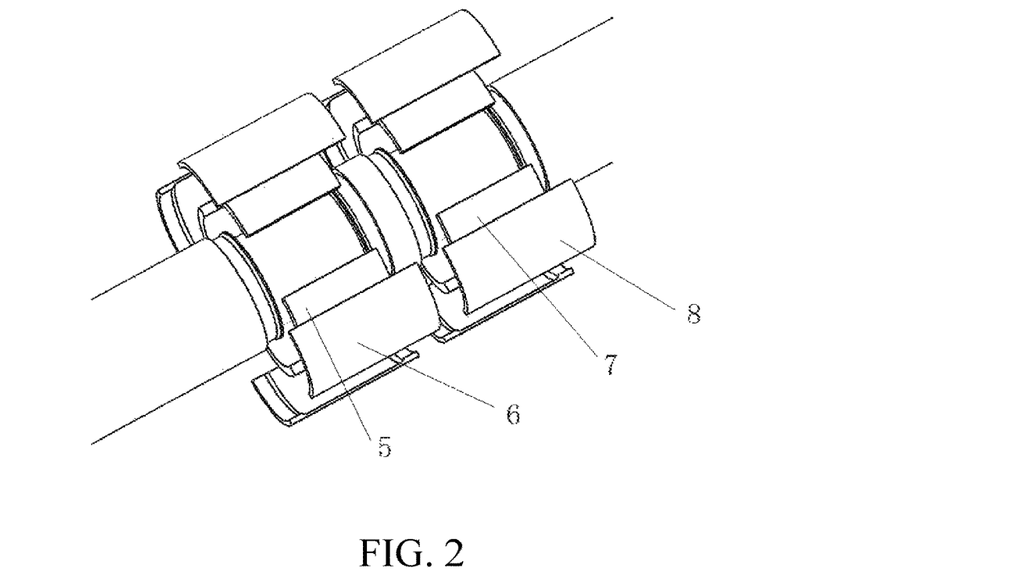
FIG. 2 is a schematic diagram showing a structure of two sets of transmitting transducers, that is, low-frequency transmitting transducers and high-frequency transmitting transducers, according to an embodiment of the present invention.

The low-frequency transmitting transducers 5 and the high-frequency transmitting transducers 7 are respectively fixed to an outer wall of the drill collar through low-frequency transmitting transducer glands 6 and high-frequency transmitting transducer glands 8. Similarly, the low-frequency transmitting transducer glands 6 and the high-frequency transmitting transducer glands 8 are all formed by four arc-shaped metal covers of 90 degrees respectively (as shown in FIG. 2).

The low-frequency transmitting transducers 5 and the high-frequency transmitting transducers 7 both operate at transducer resonance points, so as to increase the transmitted energy; and the low-frequency transmitting transducers 5 have resonance points of 2 kHz to 5 kHz, and the high-frequency transmitting transducers 7 have resonance points of 10 kHz to 15 kHz. Both the low-frequency transmitting transducers 5 and the high-frequency transmitting transducers 7 are of a tile structure to increase the radiation area.

At one signal transmitting end of the apparatus, the apparatus further includes transmitting circuit integrated units 2, transmitting end electrical connectors 3-1 connected with the transmitting circuit integrated units 2, first electrical connection lines 4-1 and second electrical connection lines 4-2.

The low-frequency transmitting transducers 5 are connected with the transmitting circuit integrated units 2 through the first electrical connection lines 4-1 and the transmitting end electrical connectors 3-1.

The high-frequency transmitting transducers 7 are connected with the transmitting circuit integrated units 2 through the second electrical connection lines 4-2 and the transmitting end electrical connectors 3-1.

At one signal receiving end of the apparatus, the apparatus further includes receiving circuit integrated units 13, receiving end electrical connectors 3-2 connected with the receiving circuit integrated units, and third electric connection lines 4-3; the receiving transducers 12 are connected with the receiving circuit integrated units 13 through the third electrical connection lines 4-3 and the receiving end electrical connectors 3-2; and the receiving transducers 12 are fixed to the outer wall of the drill collar by receiving transducer glands 14.

Figure 3:
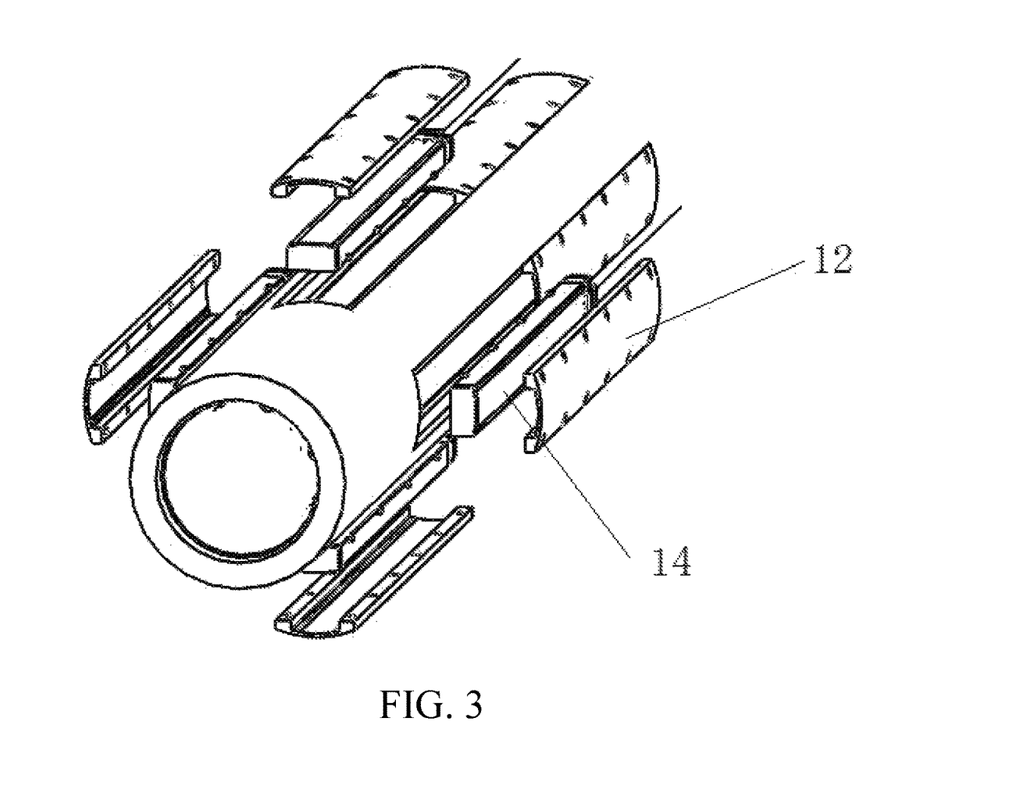
FIG. 3 is a schematic diagram showing a structure of a receiving transducer according to an embodiment of the present invention.

The receiving transducers 12 are manufactured by directly encapsulating a plurality of ceramic tiles (in this embodiment, the number of the ceramic tiles is 6 or 8, and intervals between the ceramic tiles are 6 inches or 8 inches) on a circuit board, a signal preamplifier circuit module is disposed on the circuit board to implement timely amplification of received signals, and the entire circuit board is encapsulated in a hydraulic balancing structure, so that reception of acoustic signals can be effectively realized.

The apparatus further includes a trace rod 11 penetrating through the sound insulator 9, an outer surface of the trace rod 11 is notch-grooved, and one end of the trace rod 11 is connected with the transmitting circuit integrated units 2, and its other end is connected with the receiving circuit integrated units 13.

Figure 4A:
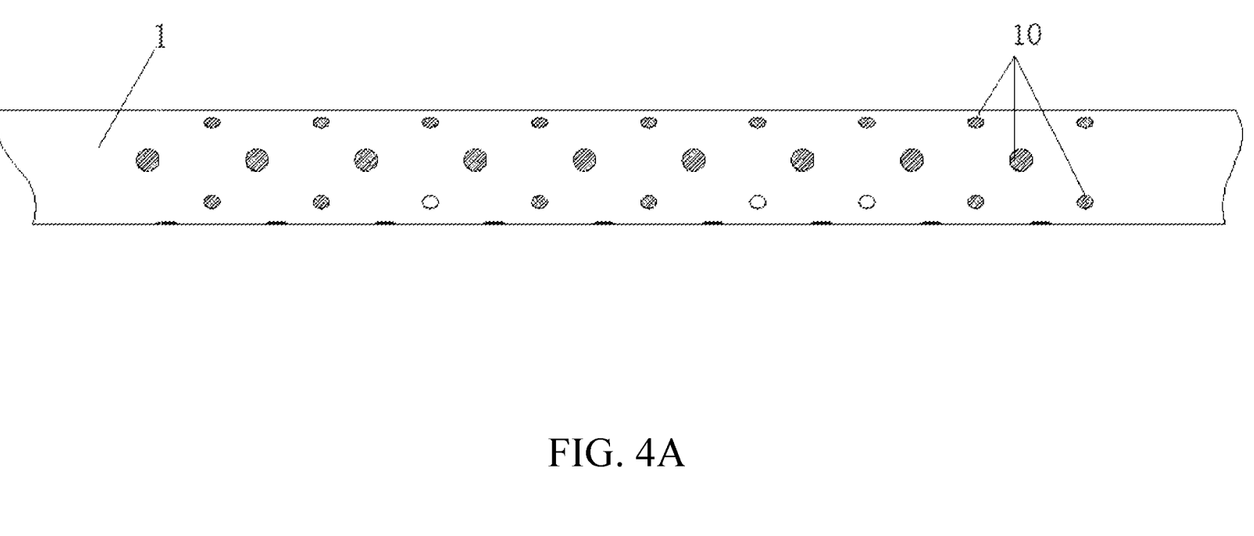
FIG. 4A is a schematic diagram showing a structure of a sound insulator according to an embodiment of the present invention.
Figure 4B:
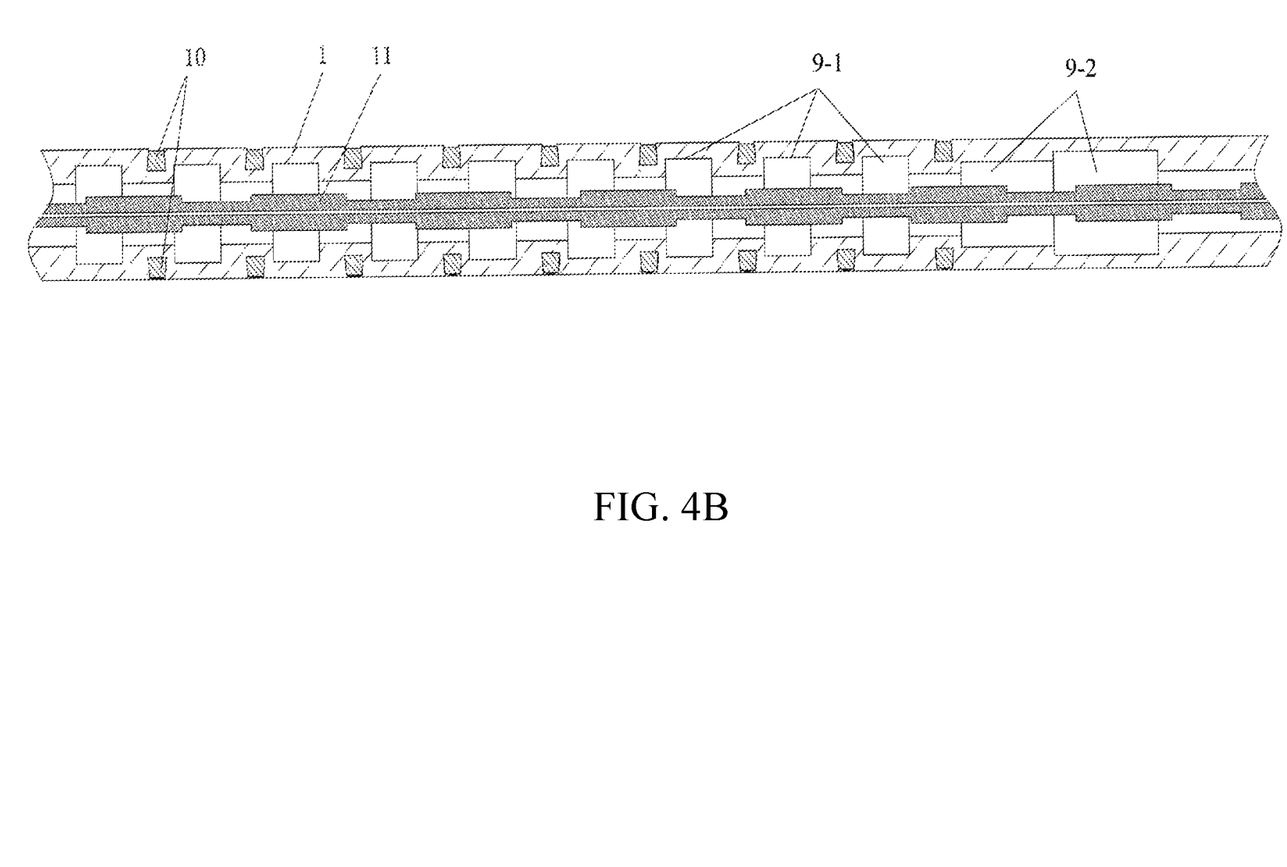
FIG. 4B is a schematic cross-sectional diagram showing a structure of a sound insulator according to an embodiment of the present invention.

The sound insulator 9 is used to realize sound insulation of monopole, quadrupole, polarized pole and dipole drill collar waves; the sound insulator employs a combined sound insulation mode of inner notch grooves and inner reducers and hard alloy rod bodies (as shown in FIG. 4A to FIG. 4B); a structure of the sound insulator is specifically as follows: the sound insulator includes a drill collar with notch grooves on an inner wall, and hard alloy rod bodies 10 embedded in the outer wall of the drill collar, wherein the notch grooves on the inner wall of the drill collar include inner reducer structure grooves 9-2 and inner notch grooves 9-1 with constant diameters and widths, the inner reducer structure grooves 9-2 are disposed at one end, which is close to the receiving transducers 12, of the sound insulator, in this embodiment, the number of the inner reducer structure grooves is 2, and the diameters of the inner reducer structure grooves are sequentially increased by a second-order arithmetic progression along a direction from the transmitting transducers to the receiving transducers; and the diameter of the inner reducer structure groove with the largest diameter is the same as the diameter of the inner notch grooves, and the width of each inner reducer structure groove is three times the width of the inner notch grooves.

Further, the hard alloy rods embedded on the outer wall of the drill collar with the inner notch grooves include large outer-diameter cylindrical hard alloy rods and small outer-diameter cylindrical hard alloy rods; the large outer-diameter cylindrical hard alloy rods are embedded at non-notch groove positions, and every four large outer-diameter cylindrical hard alloy rods are uniformly distributed in a radial direction of the outer wall of the drill collar as one group;

and the small outer-diameter cylindrical hard alloy rods are embedded at notch groove positions, and every four small outer-diameter cylindrical hard alloy rods are uniformly distributed in a radial direction of the outer wall of the drill collar as one group.

The large outer-diameter tungsten rods have outer diameters of 25 mm to 40 mm and lengths of 25 mm to 30 mm; and the small outer-diameter cylindrical tungsten rods have outer diameters of 10 mm to 15 mm and lengths of 5 mm to 8 mm.

The apparatus employs a dual-row transmitting transducer setup because quadrupole and dipole acoustic signals are more seriously attenuated than monopole and polarized pole acoustic signals, so that the quadrupole and dipole acoustic signals are transmitted by adopting low-frequency transmitting transducers, and the monopole and polarized pole acoustic signals are transmitted by adopting high-frequency transmitting transducers. Receiving apparatuses are four transducer encapsulating apparatuses distributed at 90 degrees. When the azimuthally acoustic imaging LWD apparatus operates, acoustic source signals generated by two columns of transmitting transducers are propagated through a formation and received by the receiving transducers in receiving transducer encapsulating apparatuses, and the information about the formation is measured by extracting a time difference of the formation.

The following are operation methods of dipole, quadrupole, monopole and polarized pole operation modes.

When the apparatus is in the quadrupole operation mode, the four low-frequency transmitting transducers disposed on the apparatus operate independently, the transmitting circuit integrated units output signals to ensure that positive pulses are applied to two transmitting transducer tiles which are opposite at an angle of 180 degrees, and negative pulses are applied to another set of two transmitting transducer tiles which are opposite at an angle of 180 degrees, so that quadrupole acoustic signal transmission is completed; and when the apparatus is in the quadrupole operation mode, receiving transducer control signals controlled by the transmitting circuit integrated units are transferred to the receiving circuit integrated units through the trace rod, so that the receiving transducers in all four directions operate. A part of quadrupole mode waves is refracted into the formation by a drilling fluid, propagated in the formation, then reaches a receiving end, and is received by the receiving transducers, as such, a shear wave propagation velocity of the formation is calculated according to time for which acoustic waves are propagated in the formation; and the other part of the quadrupole mode waves is transferred to the receiving end through the drill collar, that is, the drill collar direct waves (noise signals), and this part of the signals is received by the receiving transducers as well to form interference signals.

When the apparatus is in the dipole operation mode, the transmitting circuit integrated units output signals to ensure that two low-frequency transmitting transducers which are opposite at an angle of 180 degrees operate, but their operation modes are as follows: a positive pulse is applied to one low-frequency transmitting transducer and a negative pulse is applied to the other low-frequency transmitting transducer, and two another low-frequency transmitting transducer tiles distributed at an angle of 180 degrees do not operate, so that dipole acoustic wave signal transmission is completed; and when the apparatus is in the dipole operation mode, receiving transducer control signals controlled by the transmitting circuit integrated units are transferred to the receiving circuit integrated units through the trace rod to make the receiving transducers in the same direction as that of the two operating transmitting transducers operate. A part of dipole mode waves is refracted into the formation by the drilling fluid, propagated in the formation, then reaches the receiving end, and is received by the receiving transducers, as such, a shear wave propagation velocity of the formation is calculated according to the time for which the acoustic waves are propagated in the formation; and the other part of the dipole mode waves is transferred to the receiving end through the drill collar, that is, the drill collar direct waves (noise signals), and this part of the signals is received by the receiving transducers as well to form interference signals.

When the apparatus is in the monopole operation mode, the transmitting circuit integrated units output signals to ensure that four high-frequency transmitting transducers all operate, and positive pulses are simultaneously applied to them, so that high-frequency monopole signal transmission is completed; and when the apparatus is in the monopole operation mode, receiving transducer control signals controlled by the transmitting circuit integrated units are transferred to the receiving circuit integrated units through the trace rod to make the receiving transducer in one direction operate, so that measuring compressional wave and Stoneley wave velocities of the formation is completed. A part of monopole mode waves is refracted into the formation by the drilling fluid, propagated in the formation, then reaches the receiving end, and is received by the receiving transducers, as such, the compressional wave and Stoneley wave velocities of the formation are calculated according to the time for which the acoustic waves are propagated in the formation; and the other part of the monopole mode waves is transmitted to the receiving end through the drill collar, that is, the drill collar direct waves (noise signals), and this part of the signals is received by the receiving transducers as well to form interference signals.

When the apparatus is in the polarized pole operation mode, the transmitting circuit integrated units output signals to ensure that one high-frequency transmitting transducer operates, and a positive pulse is applied to it, so that high-frequency polarized pole signal transmission is completed; and when the apparatus is in the polarized pole operation mode, receiving transducer control signals controlled by the transmitting circuit integrated units are transferred to the receiving circuit integrated units through the trace rod to make the receiving transducers in the same direction as that of the operating transmitting transducer operate.

A part of polarized pole mode waves is refracted into the formation in a direction corresponding to polarized pole transmitting transducers by a drilling fluid, propagated in the formation, then reaches the receiving end, and is received by the receiving transducers in the same direction as that of polarized pole transmitting transducers, as such, an acoustic wave propagation velocity of the formation is calculated according to the time for which the acoustic waves are propagated in the formation in this direction. Generally, a well circumference of 360 degrees is divided into 8 or 16 sectors, so that the acoustic wave propagation velocity, corresponding to each sector, of the formation is calculated; and the other part of the polarized pole mode waves is transferred to the receiving end through the drill collar, that is, the drill collar direct waves (noise signals), and this part of the signals is received by the receiving transducers as well to form interference signals. Such an operation mode may be used in an azimuthally acoustic imaging LWD test. When the apparatus operates, acoustic source signals generated by two sets of transducers may be coupled onto the drill collar, that is, the acoustic signals may be propagated along the drill collar, and this part of the acoustic signals propagated along the drill collar is interference signals, which may be suppressed as far as possible. The combined sound insulation mode of the notch grooves and the reducers and the tungsten rods can effectively realize the suppression of the drill collar waves.

What is claimed is:

1. An azimuthally acoustic imaging logging while drilling (LWD) apparatus, comprising:
    a drill collar having a first section and a second section,
    a low-frequency transmitting transducer, a high-frequency transmitting transducer, and a transmitting integrated circuit unit disposed on the first section of the drill collar;
    a receiving transducer and a receiving integrated circuit unit disposed on the second section of the drill collar;
    a sound insulator disposed between the first section and the second section;
    a trace rod extending through the sound insulator, wherein a first end of the trace rod is connected with the transmitting integrated circuit unit, and a second end of the trace rod is connected with the receiving integrated circuit unit,
    wherein, during operation, the low-frequency transmitting transducer and the high-frequency transmitting transducer both operate at their respective transducer resonance points.

2. The azimuthally acoustic imaging LWD apparatus according to claim 1, wherein the low-frequency transmitting transducer has a resonance point in a range of 2 kHz to 5 kHz, and the high-frequency transmitting transducer has a resonance point in a range of 10 kHz to 15 kHz.

3. The azimuthally acoustic imaging LWD apparatus according to claim 2, wherein the high-frequency transmitting transducer and the low-frequency transmitting transducer affixed to an outer wall in the first section of the drill collar and are connected with the transmitting integrated circuit unit.

4. The azimuthally acoustic imaging LWD apparatus according to claim 2, wherein the receiving transducer is affixed to an outer wall in the second section of the drill collar and is connected to the receiving integrated circuit unit.

5. The azimuthally acoustic imaging LWD apparatus according to claim 1, wherein the receiving transducer comprises a plurality of ceramic tiles encapsulated onto an elongated support, wherein a signal preamplifier circuit module is disposed on the elongated support.

6. The azimuthally acoustic imaging LWD apparatus according to claim 5, wherein an outer surface of the trace rod has notch grooves.

7. The azimuthally acoustic imaging LWD apparatus according to claim 1,
    the sound insulator comprises a collar with notch grooves on an inner wall, and a plurality of hard alloy rods embedded in an outer wall of the collar, wherein the notch grooves on the inner wall of the collar comprise inner reducer structure grooves and inner notch grooves with constant diameters and widths, wherein the inner reducer structure grooves are disposed at one end of the sound insulator proximate to the receiving transducer.

8. The azimuthally acoustic imaging LWD apparatus according to claim 7, wherein the hard alloy rods further include one or more first rods having a larger diameter and one or more second rods having a smaller diameter, wherein the first rods are embedded at non-notch groove positions, and the second rods are embedded at notch groove positions.

9. The azimuthally acoustic imaging LWD apparatus according to claim 8, wherein the first rod is a tungsten rod having a diameter in a range of 25 mm to 40 mm and a length in a range of 25 mm to 30 mm; and the second tungsten rod having a diameter in a range of 10 mm to 15 mm and a length in a range of 5 mm to 8 mm.

10. The azimuthally acoustic imaging LWD apparatus according to claim 7, wherein the hard alloy rods are tungsten rods.

* * * * *